US008946626B2

(12) United States Patent
Giles et al.

(10) Patent No.: US 8,946,626 B2
(45) Date of Patent: Feb. 3, 2015

(54) ION TRAP WITH SPATIALLY EXTENDED ION TRAPPING REGION

(75) Inventors: Kevin Giles, Stockport (GB); Martin Raymond Green, Bowdon (GB); Daniel James Kenny, Knutsford (GB); David J. Langridge, Stockport (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/240,667

(22) PCT Filed: Aug. 22, 2012

(86) PCT No.: PCT/GB2012/052053

§ 371 (c)(1),
(2), (4) Date: Apr. 29, 2014

(87) PCT Pub. No.: WO2013/027054

PCT Pub. Date: Feb. 28, 2013

(65) Prior Publication Data

US 2014/0299761 A1 Oct. 9, 2014

Related U.S. Application Data

(60) Provisional application No. 61/528,891, filed on Aug. 30, 2011.

(30) Foreign Application Priority Data

Aug. 25, 2011 (GB) .................................. 1114735.2

(51) Int. Cl.
*H01J 49/00* (2006.01)
*H01J 49/42* (2006.01)
*B01D 59/44* (2006.01)

(52) U.S. Cl.
CPC .................................... *H01J 49/424* (2013.01)
USPC ........... 250/292; 250/282; 250/283; 250/293; 250/290

(58) Field of Classification Search
CPC ... H01J 49/062; H01J 49/0072; H01J 49/063; H01J 49/422; H01J 49/4225; H01J 49/02; H01J 49/424; H01J 49/4285
USPC .......................... 250/292, 282, 290, 283, 293
See application file for complete search history.

(56) References Cited

U.S. PATENT DOCUMENTS

| | | | | |
|---|---|---|---|---|
| 5,576,540 | A | 11/1996 | Jolliffe | |
| 5,783,824 | A | 7/1998 | Baba et al. | |
| 6,483,109 | B1 * | 11/2002 | Reinhold et al. | 250/292 |
| 7,157,698 | B2 | 1/2007 | Makarov et al. | |

(Continued)

FOREIGN PATENT DOCUMENTS

| | | |
|---|---|---|
| CN | 101364519 | 2/2009 |
| GB | 2488439 | 8/2012 |

*Primary Examiner* — Nikita Wells
(74) *Attorney, Agent, or Firm* — Diederiks & Whitelaw, PLC

(57) ABSTRACT

A mass or mass to charge ratio selective ion trap is disclosed having an increased charge storage capacity. A RF voltage acts to confine ions in a first (y) direction within the ion trap. A DC voltage and/or an RF voltage acts to confine ions in a second (x) direction within the ion trap. A quadratic DC potential well acts to confine ions in a third (z) direction within the ion trap. Ions are excited in the third (z) direction and are caused to be mass or mass to charge ratio selectively ejected in the third (z) direction.

39 Claims, 12 Drawing Sheets

(56) References Cited

U.S. PATENT DOCUMENTS

| | | | | |
|---|---|---|---|---|
| 7,582,864 | B2 | 9/2009 | Verentchikov | |
| 7,759,641 | B2 | 7/2010 | Hasegawa et al. | |
| 7,960,694 | B2 | 6/2011 | Hoyes | |
| 8,080,788 | B2 * | 12/2011 | Stoermer | 250/293 |
| 8,212,208 | B2 * | 7/2012 | Green et al. | 250/283 |
| 8,227,751 | B2 | 7/2012 | Green | |
| 8,658,970 | B2 * | 2/2014 | Kenny | 250/283 |
| 2008/0210859 | A1 | 9/2008 | Tolley et al. | |
| 2009/0179148 | A1 | 7/2009 | Yasuda et al. | |
| 2009/0206250 | A1 | 8/2009 | Wollnik | |
| 2009/0294655 | A1 | 12/2009 | Ding et al. | |
| 2014/0048696 | A1 | 2/2014 | Giles et al. | |

* cited by examiner

Fig. 1A
Prior Art
Fig. 1B
Prior Art
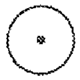
Fig. 1C
Prior Art
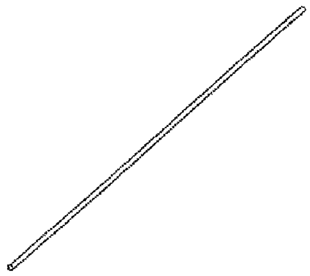
Fig. 1D
Prior Art
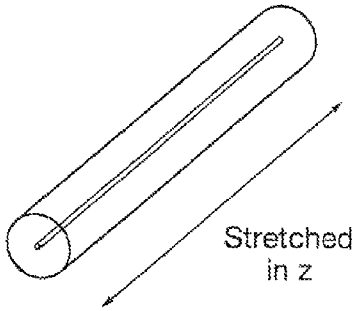
Fig. 1E
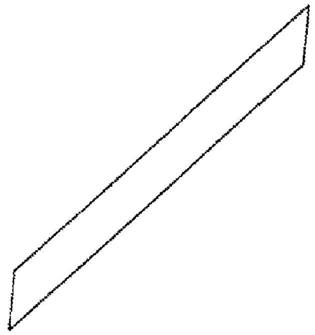
Fig. 1F
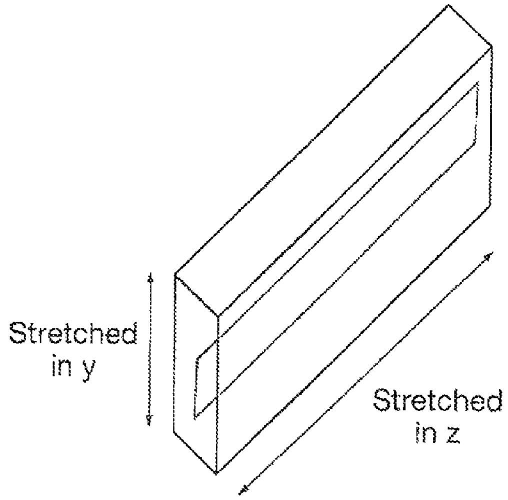

ION TRAP WITH SPATIALLY EXTENDED ION TRAPPING REGION

CROSS REFERENCE TO RELATED APPLICATIONS

This application is the National Stage of International Application No. PCT/GB2012/052053, filed 22 Aug. 2012, which claims priority from and the benefit of U.S. Provisional Patent Application Ser. No. 61/528,891 filed on 30 Aug. 2011 and United Kingdom Patent Application No. 1114735.2 filed on 25 Aug. 2011. The entire contents of these applications are incorporated herein by reference.

BACKGROUND OF THE INVENTION

The present invention relates to a mass or mass to charge ratio selective ion trap. The preferred embodiment relates to ion guiding and trapping systems and methodology for use in mass spectrometry systems.

It is well known that the time averaged force on a charged particle or ion due to an AC inhomogeneous electric field is such as to accelerate the charged particle or ion to a region where the electric field is weaker. A minimum in the electric field is commonly referred to as a pseudo-potential well or valley. Correspondingly, a maximum is commonly referred to as a pseudo-potential hill or barrier.

Paul traps, also known as 3D ion traps, are designed to exploit this phenomenon by causing a pseudo-potential well to be formed in the centre of the ion trap. The pseudo-potential well is then used to confine a population of ions. Due to its symmetric nature the 3D ion trap acts to confine ions to a single point in space as shown in FIG. 1A. However, the mutual repulsion between ions of identical polarity in addition to the non-zero kinetic energy of the confined ions lead to the ions occupying a spherical volume at the centre of the ion trap as illustrated in FIG. 1B.

There is a finite space charge capacity for any ion confining device beyond which its performance begins to degrade and where ultimately the device cannot hold any further charges. For example, overfilling an ion trap leads to a loss of mass resolution and of mass accuracy, a result of the electric field becoming distorted by the presence of the large number of charges being focussed into close proximity. It is generally the case that the space charge limit for storage of ions is significantly greater than the spectral or analytical space charge limit which is the maximum number of ions which can be confined whilst retaining a given mass resolution and mass accuracy.

For mass spectrometry applications it is necessary to detect the mass to charge ratio (m/z) of the confined ions. For example, ions may be ejected in a mass selective manner towards an ion detector (although many other detection methods exist). There are several known methods of ejecting ions either resonantly or non-resonantly to achieve this goal.

It is often necessary to introduce gas into ion trapping devices. The gas may be used for cooling purposes or ion fragmentation via Collision Induced Decomposition ("CID"). Ion Mobility Separation ("IMS") has also been performed either with a static volume of gas or with a flow of gas. The use of pulsed gas valves to introduce gas into ion traps is also known.

Recently, there has been increased interest in 2D or Linear Ion Traps ("LIT") because of the increased volume which the confined ions are able to occupy. Linear ion traps allow a greater number of ions, or more correctly a greater number of charges, to be confined and then detected. Such ion traps are generally based on multipolar RF ion guides such as quadrupoles, hexapoles or octopoles. A pseudo-potential well is formed within the rod set ion trap around the central axis of the ion guide so that ions are confined radially within the ion trap. The ions are normally confined axially using DC fields although methods of using RF fields to axially confine ions are also known.

The radial pseudo potential of a 2D ion trap acts to focus the confined ions to a line through the central axis of the ion trap as shown in FIG. 1C. In a similar manner to 3D ion traps, ions confined within a 2D ion trap will in practice be spatially distributed and thus occupy an elongated cylindrical volume as shown in FIG. 1D.

Ion ejection has been demonstrated both radially and axially using 2D ion traps by resonantly exciting the ions within the confining radial pseudo potential. Radial ejection has been achieved by allowing the ions to resonate until their radial excursions reach the quadrupole electrodes at which point they pass through narrow slots in the electrodes. Axial ejection has been achieved by resonantly exciting the ions into the naturally occurring fringing fields which exist at the exit of a quadrupole at which point it is possible for the ions to gain sufficient axial kinetic energy to overcome the confining DC barrier. Both of these methods are inherently non-adiabatic in nature and lead to large ejection energies and large energy spreads which makes them generally unsuitable for coupling with other devices such as other mass analysers.

Another form of axial ejection from a 2D ion trap is known and comprises superimposing an axial harmonic DC potential upon a radial confining RF of an ion guide. Such approaches are schematically represented in FIGS. 2A-C.

FIG. 2A shows a 2D ion trap comprising a series of annular electrodes which coaxially encompass a quadrupole rod set. RF voltages are applied to the rod set electrodes in order to cause ions to be radially confined. DC voltages are applied to the annular electrodes to produce an axial DC potential within the rod set.

FIG. 2B shows a 2D ion trap comprising an RF quadrupole rod set with additional vane electrodes placed on the ground planes which are used to provide an axial DC potential.

FIG. 2C shows a 2D ion trap comprising an axially segmented RF quadrupole rod set. Different DC voltages may be applied to each segment in order to provide an axial DC potential.

With respect to the 2D ion traps shown in FIGS. 2A-2C, the DC potential which is applied in the axial (z) direction is given by Eqn. 1:

$$U_z(t)=(a+b\cdot\cos(\Omega t))\cdot z^2 \tag{1}$$

where b is the electric field constant of the axial quadratic potential, a is the amplitude and Ω is the frequency of the modulation of the axial potential.

$$E_z = \frac{dU_z(t)}{dz} = 2(a + b\cdot\cos(\Omega t))z \tag{2}$$

$$\ddot{z} + \omega^2 z = F\cdot\cos(\Omega t) \tag{3}$$

$$\omega = \sqrt{\frac{2aq}{m}} \text{ and } F = \frac{2bq}{m}$$

$$z(t) = \frac{F}{\omega^2 - \Omega^2}\sin(\Omega t + \phi) \quad (4)$$

SUMMARY OF THE INVENTION

According to an aspect of the present invention there is provided a mass or mass to charge ratio selective ion trap comprising:

a first device arranged and adapted to generate a radially asymmetric pseudo-potential barrier or well which acts to confine ions in a first (y) and a second (x) direction within the ion trap;

a second device arranged and adapted to generate a substantially DC quadratic potential well which acts to confine ions in a third (z) direction within the ion trap; and a third device arranged and adapted to excite ions in the third (z) direction so as to mass or mass to charge ratio selectively eject ions in the third (z) direction.

According to an aspect of the present invention there is provided a mass or mass to charge ratio selective ion trap comprising:

a first device arranged and adapted to generate a pseudo-potential barrier or well which acts to confine ions in a first (y) direction and a DC potential barrier or well which acts to confine ions in a second (x) direction within the ion trap;

a second device arranged and adapted to generate a substantially DC quadratic potential well which acts to confine ions in a third (z) direction within the ion trap; and a third device arranged and adapted to excite ions in the third (z) direction so as to mass or mass to charge ratio selectively eject ions in the third (z) direction.

The first (y) direction and/or the second (x) direction and/or the third (z) direction are preferably substantially orthogonal.

The ion trap preferably comprises a plurality of electrodes.

The plurality of electrodes preferably comprise:

(i) a muitipole rod set or a segmented multipole rod set comprising a plurality of or at least 4, 5, 6, 7, 8, 9, 10, 10-20, 20-30, 30-40, 40-50, 50-60, 60-70, 70-80, 80-90, 90-100 or >100 rod sets or segmented rod sets; and/or (ii) an ion tunnel or ion funnel comprising a plurality of or at least 4, 5, 6, 7, 8, 9, 10, 10-20, 20-30, 30-40, 40-50, 50-60, 60-70, 70-80, 80-90, 90-100 or >100 annular, ring or oval electrodes having one or more apertures through which ions are transmitted in use; and/or (iii) a plurality of or at least 4, 5, 6, 7, 8, 9, 10, 10-20, 20-30, 30-40, 40-50, 50-60, 60-70, 70-80, 80-90, 90-100 or >100 half annular, half ring, half oval or C-shaped electrodes; and/or (iv) a stack or array of planar, plate or mesh electrodes arranged generally in the plane in which ions travel in use.

The first device is preferably arranged and adapted to apply an RF voltage to at least some of the electrodes.

The ion trap is preferably arranged and adapted so that there is a full and/or direct line of sight through the ion trap in the third (z) direction.

The ion trap is preferably arranged and adapted so that there is a full and/or direct line of sight through the ion trap in the second (x) direction.

The second device is preferably arranged and adapted to form the substantially quadratic DC potential well so that either: (i) a minimum of the substantially quadratic DC potential well is along a central axis of the ion trap; or (ii) a minimum of the substantially quadratic DC potential well is offset from a central axis of the ion trap.

According to an aspect of the present invention there is provided a mass or mass to charge ratio selective ion trap having a substantially toroidal ion trapping region, the ion trap comprising:

a first device arranged and adapted to generate a pseudo-potential barrier or well which acts to confine ions in a first (y) direction within the ion trap;

a second device arranged and adapted to generate a substantially DC quadratic well which acts to confine ions radially within the ion trap; and a third device arranged and adapted to excite ions in a radial (r) direction so as to mass or mass to charge ratio selectively eject ions in the radial (r) direction.

The first (y) direction is preferably substantially orthogonal to the radial (r) direction.

The ion trap preferably comprises a plurality of electrodes.

The plurality of electrodes preferably comprise:

(i) a first group of electrodes and a second group of electrodes, wherein the first group of electrodes comprises a first plurality of concentric closed loop, circular or oval electrodes arranged at different radial displacements and wherein the second group of electrodes comprises a second plurality of concentric closed loop, circular or oval electrodes arranged at different radial displacements, wherein the first and second groups of electrodes are arranged at different displacements in the first (y) direction; or (ii) a first group of electrodes and a second group of electrodes, wherein the first group of electrodes comprises a first plurality of annular groups of electrodes wherein each of the first annular groups of electrodes is arranged at different radial displacements and wherein the second group of electrodes comprises a second plurality of annular groups of electrodes wherein each of the second annular groups of electrodes is arranged at different radial displacements, wherein the first and second groups of electrodes are arranged at different displacements in the first (y) direction.

The first device is preferably arranged and adapted to apply an RF voltage to at least some of the electrodes.

The ion trap is preferably arranged and adapted so that there is a full and/or direct line of sight through the ion trap in the radial (r) direction.

The third device is preferably arranged and adapted to excite ions in a radial (r) direction so as to mass or mass to charge ratio selectively eject ions towards the centre of the ion trap.

The pseudo-potential barrier or well preferably comprises a non-quadrupolar pseudo-potential barrier or well.

The second device is preferably arranged and adapted to maintain the substantially DC quadratic potential well across some but not all electrodes arranged in the third (z) or radial (r) direction.

The second device is preferably arranged and adapted to maintain a substantially DC quadratic potential well across x % of the width of the ion trap in the third (z) or radial (r) direction, wherein x is selected from the group consisting of: (i)<10; (ii) 10-20; (iii) 20-30; (iv) 30-40; (v) 40-50; (vi) 50-60; (vii) 60-70; (viii) 70-80; (ix) 80-90; (x) 90-95; and (xi) 95-99.

The second device is preferably arranged and adapted to maintain a DC potential profile in the third (z) or radial (r) direction across the ion trap wherein the DC potential profile comprises a first region and one or more second regions, wherein the DC potential profile in the first region is substantially quadratic and wherein the DC potential profile in the one or more second regions is substantially linear, constant or non-quadratic.

The second device is preferably arranged and adapted to maintain a DC potential profile in the third (z) or radial (r) direction which is asymmetric preferably about a central axis of the ion trap, wherein the central axis is preferably in the second (x) direction.

The second device is preferably arranged and adapted to maintain a DC potential profile in the third (z) or radial (r) direction which results in ions being ejected from the substantially DC quadratic well in one direction only.

The third device is preferably arranged and adapted so that ions are mass or mass selectively ejected from the ion trap either: (i) in a first direction only, or (ii) both in a first direction and a second direction, wherein the second direction is different to or opposed to the first direction.

The third device is preferably arranged and adapted to excite ions resonantly in the third (z) or radial (r) direction.

The third device is preferably arranged and adapted to apply a supplemental AC voltage or potential to at least some of the electrodes having a frequency $\sigma$ which is equal to $\omega$, wherein $\omega$ is the fundamental or resonance frequency of ions which are desired to be ejected from the ion trap.

The third device is preferably arranged and adapted to excite ions parametrically in the third (z) or radial (r) direction.

The third device is preferably arranged and adapted to apply a supplemental AC voltage or potential to at least some of the electrodes having a frequency $\sigma$ equal to $2\omega$, $0.667\omega$, $0.5\omega$, $0.4\omega$, $0.33\omega$, $0.286\omega$, $0.25\omega$ or $<0.25\omega$, wherein $\omega$ is the fundamental or resonance frequency of ions which are desired to be ejected from the ion trap.

The third device is preferably arranged and adapted to scan, vary, alter, increase, progressively increase, decrease or progressively decrease the frequency $\sigma$ of the supplemental AC voltage or potential.

The third device is preferably arranged and adapted: (i) in a mode of operation to eject ions from the ion trap in order of their mass to charge ratio; and/or (II) in a mode of operation to eject ions from the ion trap in reverse order of their mass to charge ratio.

The third device is preferably arranged and adapted to cause ions to be ejected from the ion trap in a substantially adiabatic manner.

The third device is preferably arranged and adapted to cause ions to be ejected from the ion trap with an ion energy selected from the group consisting of: (i)<0.5 eV; (ii) 0.5-1.0 eV; (iii) 1.0-1.5 eV; (iv) 1.5-2.0 eV; (v) 2.0-2.5 eV; (vi) 2.5-3.0 eV; (vii) 3.0-3.5 eV; (viii) 3.5-4.0 eV; (ix) 4.0 eV-4.5 eV; (x) 4.5-5.0 eV; and (xi) >5.0 eV.

The ion trap is preferably arranged and adapted to contain N ion charges within the ion trap, wherein N is selected from the group consisting of: (i)$<5\times10^4$; (ii) $5\times10^4$-$1\times10^5$; (iii) $1\times10^5$-$2\times10^5$; (iv) $2\times10^5$-$3\times10^5$; (v) $3\times10^5$-$4\times10^5$; (vi) $4\times10^5$-$5\times10^5$; (vii) $5\times10^5$-$6\times10^5$; (viii) $6\times10^5$-$7\times10^5$; (ix) $7\times10^6$-$8\times10^5$; (x) $8\times10^5$-$9\times10^5$; (xi) $9\times10^5$-$1\times10^6$; and (xii) $>1\times10^6$.

In a mode of operation at least a region or substantially the whole of the ion trap is preferably arranged and adapted to be operated:

(i) as an ion guide; and/or
(ii) as a collision or fragmentation cell; and/or
(iii) as a reaction cell; and/or
(ii) as a mass filter; and/or
(iii) as a time of flight separator; and/or
(iv) as an ion mobility separator; and/or
(v) as a differential ion mobility separator.

In a mode of operation the ion trap is preferably arranged and adapted to be maintained at a pressure selected from the group consisting of (i)$<1.0\times10^{-7}$ mbar; (ii) $1.0\times10^{-7}$-$1.0\times10^{-6}$ mbar; (iii) $1.0\times10^{-6}$-$1.0\times10^{-5}$ mbar; (iv) $1.0\times10^{-5}$-$1.0\times10^{-4}$ mbar; (v) $1.0\times10^{-4}$-$1.0\times10^{-3}$ mbar; (vi) 0.001-0.01 mbar; (vii) 0.01-0.1 mbar; (viii) 0.1-1 mbar, (ix) 1-10 mbar; (x) 10-100 mbar; and (xi) 100-1000 mbar.

According to an aspect of the present invention there is provided a mass spectrometer comprising a mass or mass to charge ratio selective ion trap as described above.

According to an aspect of the present invention there is provided a method of mass or mass to charge ratio selective ejection of ions from an ion trap comprising:

generating a radially asymmetric pseudo-potential barrier or well which acts to confine ions in a first (y) and a second (x) direction within the ion trap; generating a substantially DC quadratic potential well which acts to confine ions in a third (z) direction within the ion trap; and exciting ions in the third (z) direction so as to mass or mass to charge ratio selectively eject ions in the third (z) direction.

According to an aspect of the present invention there is provided a method of mass or mass to charge ratio selective ejection of ions from an ion trap comprising: generating a pseudo-potential barrier or well which acts to confine ions in a first (y) direction and a DC potential barrier or well which acts to confine ions in a second (x) direction within the ion trap;

generating a substantially DC quadratic potential well which acts to confine ions in a third (z) direction within the ion trap; and exciting ions in the third (z) direction so as to mass or mass to charge ratio selectively eject ions from the ion trap in the third (z) direction.

According to an aspect of the present invention there is provided a method of mass or mass to charge ratio selective ejection of ions from an ion trap having a substantially toroidal ion trapping region, comprising:

generating a pseudo-potential barrier or well which acts to confine ions in a first (y) direction within the ion trap;

generating a substantially DC quadratic well which acts to confine ions radially (r) within the ion trap; and exciting ions in a radial (r) direction so that ions are mass or mass to charge ratio selectively ejected in the radial (r) direction.

According to an aspect of the present invention there is provided a method of mass spectrometry comprising a method as described above.

According to an aspect of the present invention there is provided an ion trap with a trapping volume which is spatially extended in two spatial dimensions from which ions may be ejected in a substantially mass to charge ratio dependent manner.

Although 2D ion traps have a larger ion capacity than 3D ion traps, the need for ion traps with yet further increased ion capacity continues to grow as instruments become every increasingly more sensitive and ion sources become brighter.

The preferred embodiment of the present invention relates to an ion trap or ion transmission device with an enlarged trapping or transmitting volume wherein the ion trap comprises a 1D ion trap which is arranged and adapted to confine and eject ions and which has a greater ion charge capacity than conventional 3D and 2D ion traps. In the same way that a 3D ion trap fundamentally confines ions to a point and a 2D ion trap fundamentally confines ions to a line, the 1D ion trap according to the preferred embodiment fundamentally confines ions to a plane as shown in FIG. 1E. However, in practice the actual volume occupied by the ions will expand to fill a rectangular prism which is elongated in two spatial dimensions as shown in FIG. 1F.

A preferred embodiment of the invention comprises an array of electrodes defining an extended volume to which various combinations of RF, AC and DC voltages are applied. The device may act as either a transmission device or as an ion trap which may be used to hold, accumulate, store, process, isolate, fragment, detect and eject ions. In operation some or all of the ions are distributed within the extended trapping structure and may be moved in a mass to charge ratio dependent manner towards a specific region of the device from which the ions may be subsequently ejected. Ion ejection may be effected by exciting the ions within a substantially DC quadratic potential leading to low energy ion ejection with a consequent low energy spread to the ejected ions.

The ion trap may be operated as a mass analyser or may be used in conjunction with mass analysers or other devices within a mass spectrometer.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; and (xx) a Glow Discharge ("GD") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device: (xv) a magnetic field induced fragmentation device; (xvi) an enzyme digestion or enzyme degradation fragmentation device; (xvii) an ion-ion reaction fragmentation device; (xviii) an on-molecule reaction fragmentation device; (xix) an ion-atom reaction fragmentation device; (xx) an ion-metastable ion reaction fragmentation device; (xxi) an ion-metastable molecule reaction fragmentation device; (xxii) an Ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an on-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser (viii) a Fourier Transform ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser (xii) a Time of Flight mass analyser (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter, (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter, and (vili) a Wein filter and/or (k) a device or ion gate for pulsing ions; and/or (l) a device for converting a substantially continuous ion beam into a pulsed ion beam.

The mass spectrometer may further comprise either (i) a C-trap and an Orbitrap® mass analyser comprising an outer barrel-like electrode and a coaxial inner spindle-like electrode, wherein in a first mode of operation ions are transmitted to the C-trap and are then injected into the Orbitrap® mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the Orbitrap® mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

An RF voltage is preferably applied to the electrodes of the preferred ion trap and preferably has an amplitude selected from the group consisting of: (i)<50 V peak to peak; (ii) 50-100 V peak to peak; (iii) 100-150 V peak to peak; (iv)

150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-550 V peak to peak; (xxii) 550-600 V peak to peak; (xxiii) 600-650 V peak to peak; (xxiv) 650-700 V peak to peak; (xxv) 700-750 V peak to peak; (xxvi) 750-800 V peak to peak; (xxvii) 800-850 V peak to peak; (xxviii) 850-900 V peak to peak; (xxix) 900-950 V peak to peak; (xxx) 950-1000 V peak to peak; and (xxxi) >1000 V peak to peak.

The RF voltage preferably has a frequency selected from the group consisting of: (i)<100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz: (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The ion trap is preferably maintained at a pressure selected from the group comprising: (i) >0.001 mbar; (ii) >0.01 mbar; (iii) >0.1 mbar; (iv) >1 mbar; (v) >10 mbar; (vi) >100 mbar, (vii) 0.001-0.01 mbar; (viii) 0.01-0.1 mbar; (ix) 0.1-1 mbar; (x) 1-10 mbar and (xi) 10-100 mbar.

BRIEF DESCRIPTION OF THE DRAWINGS

Various embodiments of the present invention together with other arrangements given for illustrative purposes only will now be described, by way of example only, and with reference to the accompanying drawings in which:

FIG. 1A shows the volume occupied by ions in theory in a 3D ion trap, FIG. 1B shows the volume occupied by ions in practice in a 3D trap, FIG. 1C shows the volume occupied by ions in theory in a 2D ion trap, FIG. 1D shows the volume occupied by ions in practice in a 2D ion trap, FIG. 1E shows the volume occupied by ions in theory in a 1D ion trap according to an embodiment of the present invention and FIG. 1F shows the volume occupied by ions in practice in a 1D ion trap according to an embodiment of the present invention;

FIG. 28 shows a known linear or 2D ion trap comprising a quadrupole rod set with vane electrodes and FIG. 2C shows a known linear or 2D ion trap comprising a segmented quadrupole rod set;

FIG. 48 shows how ions may be confined in the x-direction within the preferred ion trap by applying a DC voltage to additional end plate electrodes and FIG. 4C shows how ions may by confined in the x-direction within the preferred ion trap by applying a RF voltage to additional rod electrodes;

DETAILED DESCRIPTION OF THE PREFERRED EMBODIMENTS

Figure 2A:
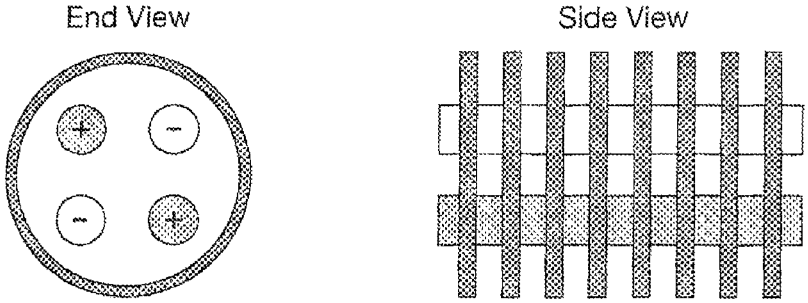
Fig. 2A Prior Art
FIG. 2A shows a known linear or 2D ion trap comprising a plurality of annular electrodes surrounding a quadrupole rod set.
Figure 2B:
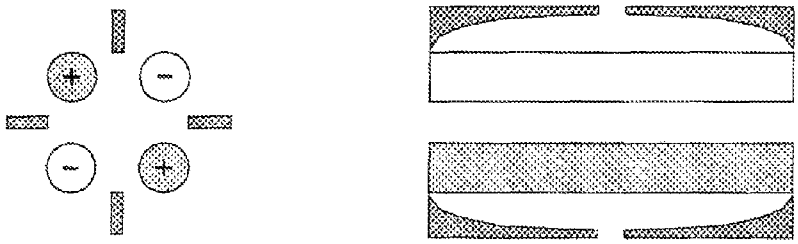
Fig. 2B Prior Art
Figure 2C:
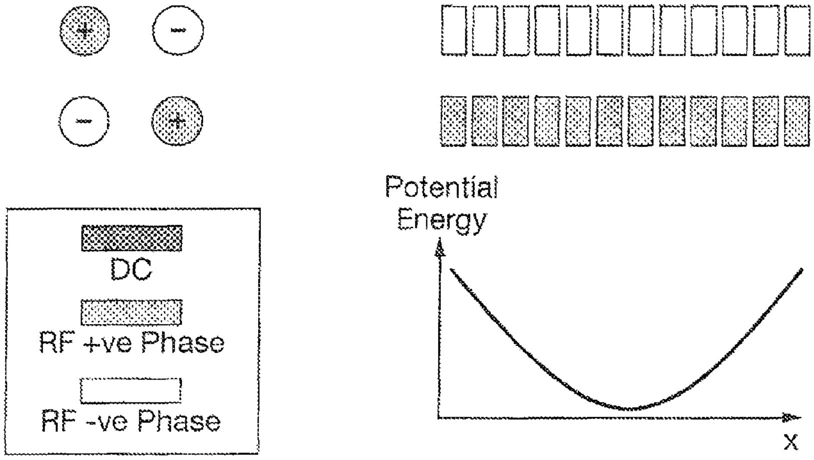
Fig. 2C Prior Art
Figure 3A:
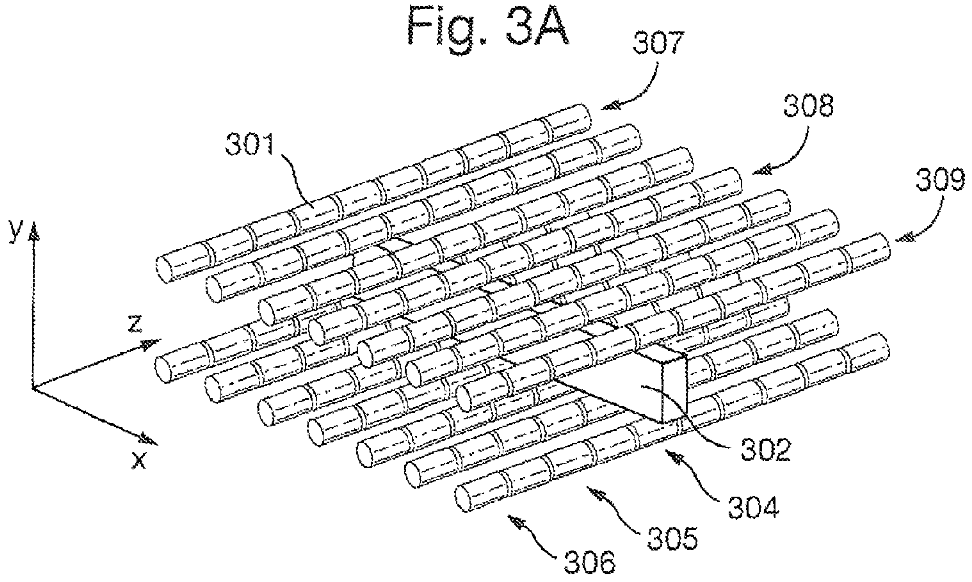
FIG. 3A shows an ion trap according to a preferred embodiment of the present invention.

An ion trap according to a preferred embodiment of the present invention will now be described with reference to FIG. 3A. The ion trap consists of an extended three dimensional array of electrodes 301. According to an embodiment the electrodes comprise axially segmented rod electrodes. However, other embodiments are also contemplated and will be described in more detail with reference to FIGS. 6A-6C below wherein the rod electrodes are not axially segmented.

The preferred ion trap can be considered as comprising two horizontal layers of electrodes. Ions are confined in the vertical (y) direction (i.e. between the two horizontal layers of electrodes) by applying an RF voltage to the electrodes. Ions are confined in the vertical (y) direction by a non-quadrupolar pseudo-potential barrier or well.

Figure 3B:
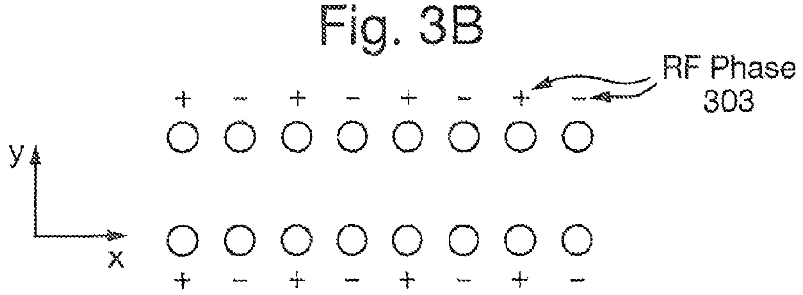
FIG. 3B shows an end on view of the preferred ion trap and FIG. 3C shows a side view of the preferred ion trap.

FIG. 3B shows an end on view of the segmented rod electrodes. According to the preferred embodiment all of the segmented electrodes in a rod are preferably maintained at the same phase of the RF voltage. Horizontally adjacent segmented rod electrodes are preferably maintained at opposite RF phases. Segmented rod electrodes in the upper layer are preferably maintained at the same RF phase as corresponding segmented rod electrodes in the lower layer.

With reference to FIG. 3B, ion confinement in the x-z plane is preferably achieved by applying opposite phases of a RF voltage 303 to adjacent rows of electrodes in the x-direction.

Figure 3C:
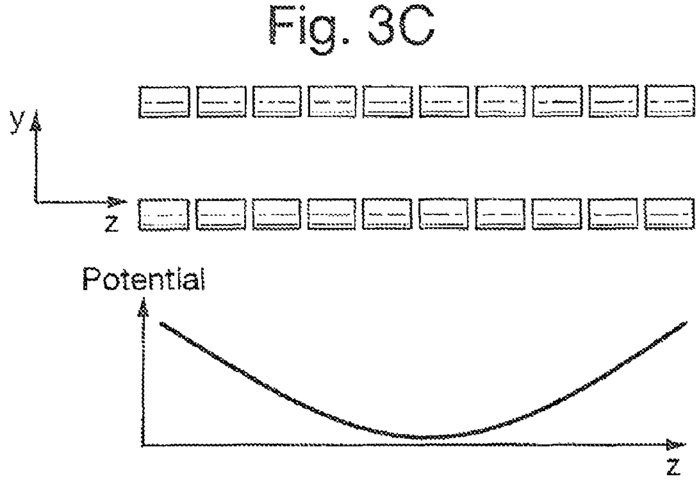

FIG. 3C shows a side view of the electrode positions to aid in the visualisation of the entire structure.

A quadratic DC potential is preferably maintained in the z-direction by applying a quadratic DC potential to the electrodes in the z-direction. As a result, ions are preferably confined in an ion volume 302 which is shown in FIG. 3A as a rectangular prism.

Ions may initially enter the ion trap in the z-direction and then the quadratic DC potential may be applied to the electrodes in the z-direction. Alternatively, the quadratic DC potential may be applied to the electrodes in the z-direction and ions may enter the ion trap in the x-direction.

Figure 4A:
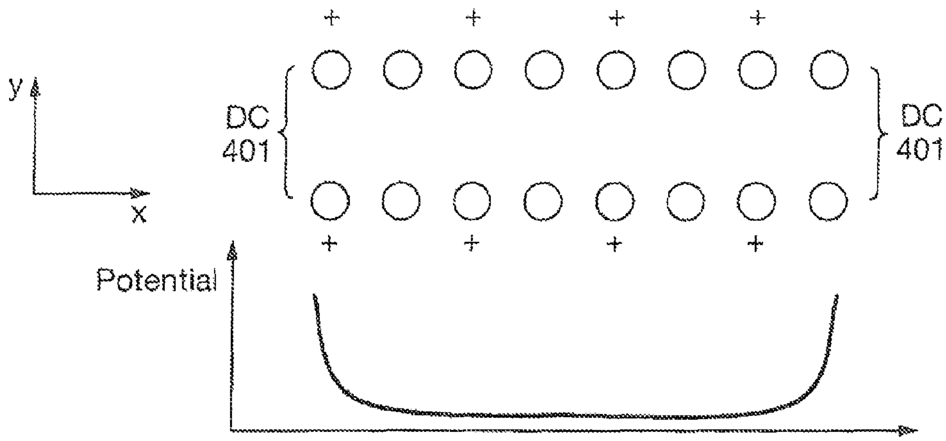
FIG. 4A shows how ions may be confined in the x-direction within the preferred ion trap by applying a DC voltage to the end pairs of electrodes.
Figure 4B:
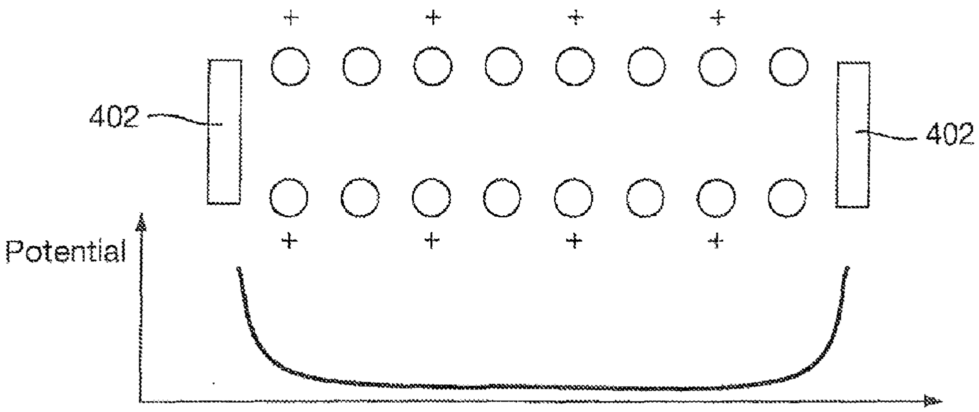
Figure 4C:
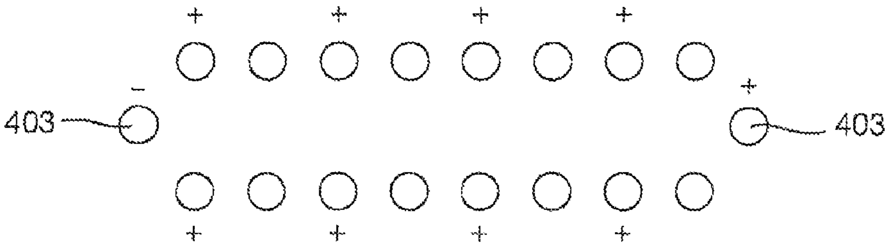

With reference to FIGS. 4A-4C a number of different techniques may be used to confine ions axially within the ion trap in the x-direction.

FIG. 4A shows a preferred embodiment of the present invention wherein ions are confined axially within the ion trap in the x-direction by applying a supplemental DC potential 401 to the end or outermost pairs of electrodes in the y-z plane. According to this embodiment ions may enter the ion trap initially in either the x- or z-directions.

FIG. 4B shows an alternative embodiment wherein a DC potential may be applied to additional end plate electrodes 402. According to this embodiment ions initially enter the ion trap via the z-direction. Once ions have entered the ion trap a quadratic potential is then preferably maintained in the z-direction.

FIG. 4C shows another alternative embodiment wherein additional segmented or non-segmented rod set electrodes 403 are provided. The RF voltage applied to the segmented rod set electrodes 301 is also preferably applied to the additional electrodes 403 so that ions are confined axially in the x-direction within the ion trap by a pseudo-potential barrier or well. According to this embodiment ions initially enter the ion trap via the z-direction. Once ions have entered the ion trap a quadratic potential is then preferably maintained in the z-direction.

According to a preferred embodiment a DC quadratic potential is preferably superimposed on the RF voltages applied to the electrodes in the z-direction such that a DC potential well is formed in the z-direction as shown in FIG. 3C. The DC quadratic potential may be applied to electrodes so that a quadratic potential well is maintained in the z-direction before or after ions have entered the ion trap.

According to an embodiment a distributed cloud of ions may enter the volume of the ion trap through either open end (x-y plane) of the ion trap in the z-direction. The ions preferably move towards the DC potential minimum under the influence of the DC field and are confined in an ion confining volume which preferably comprises a rectangular prism as shown in FIG. 3A.

According to an embodiment a background gas may be provided in the ion trap volume in order to collisionally cool the ion cloud such that the ons are confined at the DC potential minimum in the z-direction and by the confining RF voltage in the y-direction. Ions are confined in the x-direction by applying confining potentials to the end electrodes in a manner as described above with reference to FIGS. 4A-C.

The DC quadratic potential which is applied to the electrodes in the z-direction may be maintained on the end electrodes through matching segmentation in the z-direction with the main array of electrodes and applying the appropriate DC voltages.

According to the preferred embodiment the DC quadratic potential is preferably modulated in the z-direction in such a manner as to cause mass to charge ratio selective excitation and ejection of ions through the open ends of the ion trap in the x-y plane. Ions are therefore preferably ejected from the ion trap in the z-direction.

Ions ejected from the ion trap may be subjected to further analytical steps or the ions may pass to a detection system.

Embodiments of the present invention are contemplated wherein ions are mass or mass to charge ratio selectively ejected from the preferred ion trap in the z-direction in one direction only. According to an embodiment the quadratic potential which is maintained in the z-direction may be asymmetric in the sense that a quadratic potential may be maintained across a majority of the electrodes but some of the electrodes on one side of the ion trap may be maintained at a constant potential. As a result, a quadratic potential may be maintained which is effectively truncated on one side of the potential well in the z-direction. It will be apparent, therefore, that the maximum potential on one side of the potential well may be greater than the maximum potential on the other side of the potential well.

Figure 5:
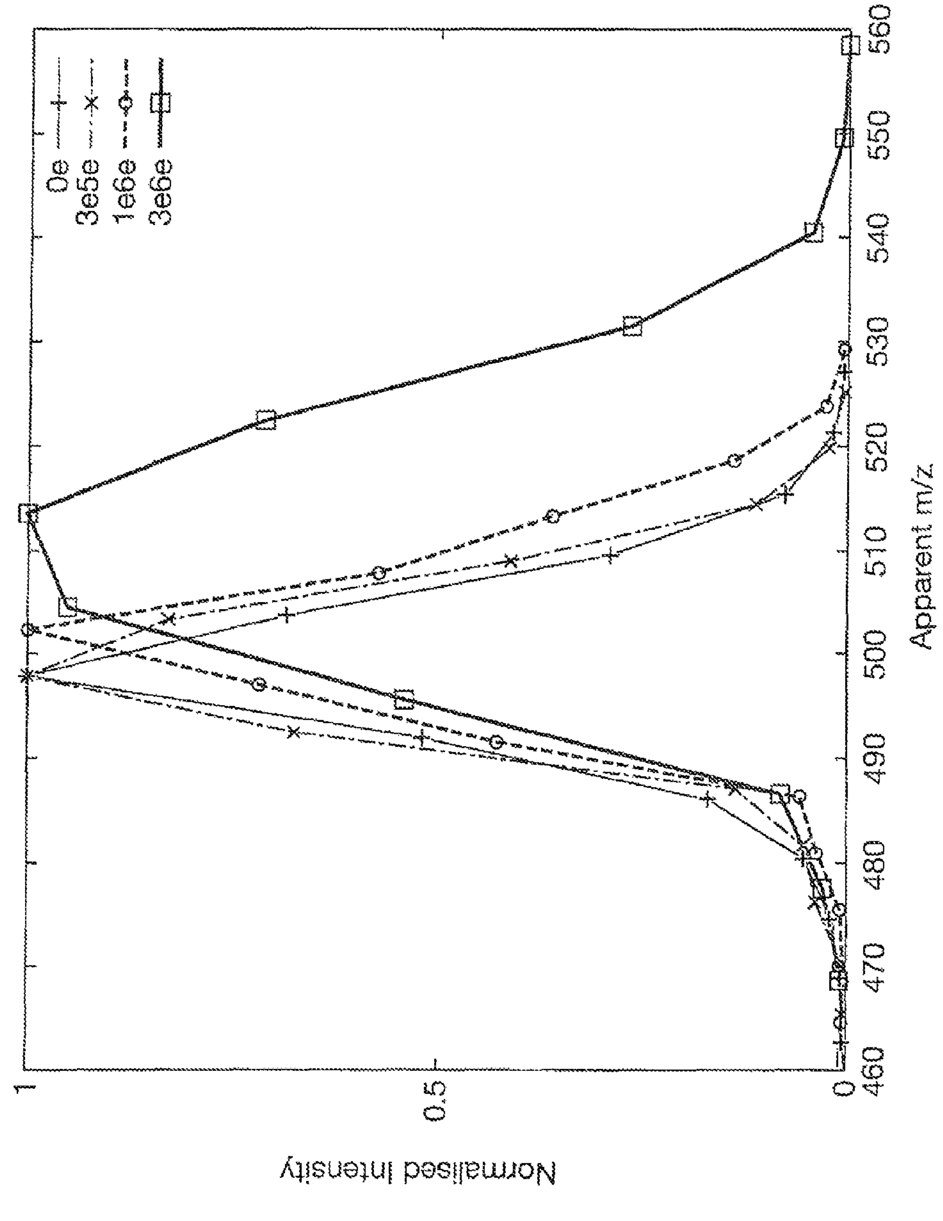
FIG. 5 shows SIMION® calculations of mass spectra for ion ejection from an ion trap according to a preferred embodiment of the present invention for differing amounts of space charge.

FIG. 5 shows SIMION® calculations of intensity versus apparent mass for ion ejection from the ion trap according to embodiments of the present invention for differing amounts of space charge.

A DC quadratic potential well was modelled as being maintained in the z-direction along the length of the ion trap with 10 V at peak and with a half length of 9.5 mm. The ion trap was modelled as being 30 mm long in the x-direction. An RF excitation voltage of 8.5V (O-peak) was modelled as being applied to the electrodes. The excitation frequency was scanned downwards to eject ions in increasing mass order. A frequency ramp was calculated to give a linear 5000 Da/s mass scan. A singly charged ion having a mass of 500 was simulated. The buffer gas was modelled as being helium gas at a pressure of $4\times10^{-3}$ mbar and a hard sphere collision model was used. Space charge was modelled using a super-ion approximation wherein each ion in the system represents a cloud of ions of a given total charge. The total charge in the system is thus the product of the number of ions flying simultaneously and the charge on each super-Ion.

Calculations were performed for: (i) no space charge; (ii) 30 ions with 10,000 charges each (i.e. 300,000 charges in total); (iii) 50 ions with 20,000 charges each (i.e. 1 million charges in total); and (iv) 60 ions with 50,000 charges each (i.e. 3 million charges in total).

It is apparent from FIG. 5 that space charge effects have minimal effect on the mass resolution of ion ejection up to $1\times10^{5}$ total charges. For example, a resolution of about 29 was calculated to be achieved for no space charge case compared with 27 for $1\times10^{6}$ charges.

When the total number of charges was modelled as being $3\times10^{6}$ then the resolution dropped to about 14 i.e. about half of the resolution observed in the absence of space charge. The peak also shifts to higher mass.

A person skilled in the art will appreciate that the ion capacity of the ion trap according to the preferred embodiment is significantly larger than conventional 2D and 3D ion traps. For example, for comparison purposes, conventional 2D ion traps see a degradation in performance (i.e. a reduction in resolution and a shift in apparent mass position) when there are only of the order of 50,000 ions present in the ion trap.

It is apparent, therefore, that the on trap according to the preferred embodiment represents a significant improvement in the art compared to conventional 2D and 3D ion traps in terms of increased ion storage capacity.

An ion trap according to an alternative less preferred embodiment is contemplated and will be described in more detail with reference to FIGS. 6A-C. The ion trap according to the alternative embodiment can be considered as corresponding with the preferred ion trap as shown and described with reference to FIGS. 3A-C but rotated through 90°.

Figure 6A:
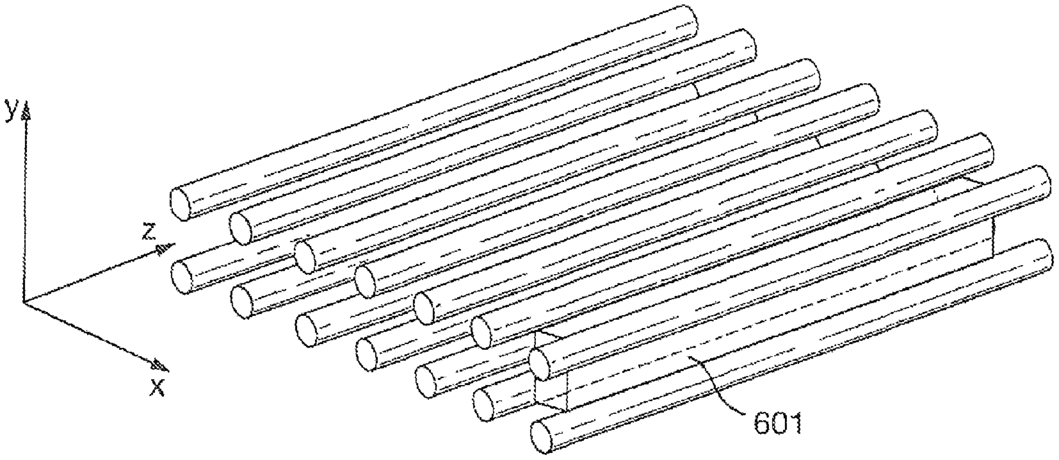
FIG. 6A shows an ion trap according to an alternative embodiment wherein the ion entry plane and quadratic DC well are rotated through 90° compared with the preferred embodiment shown in FIG. 3A.
Figure 6B:
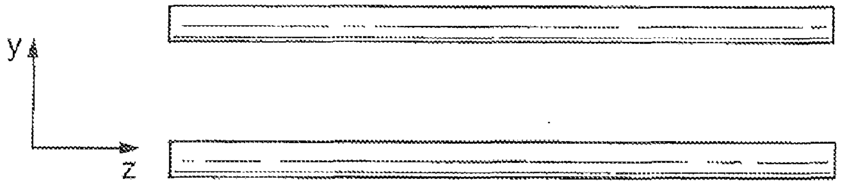
FIG. 6B shows an end on view of the ion trap according to the alternative embodiment and FIG. 6C shows a side view of the ion trap according to the alternative embodiment.
Figure 6C:
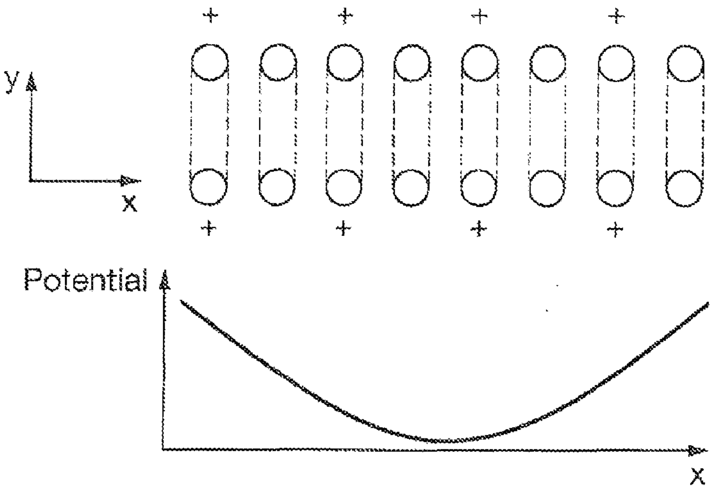

With the ion trap according to the alternative embodiment as shown in FIG. 6A ions preferably 601 enter the ion trap through either end in the y-z plane. In this embodiment a DC quadratic potential is imposed in the x-direction. According to this particular embodiment the rods do not need to be segmented as each rod has the same DC voltage applied along its entire length. However, at least some of the rod electrodes may be segmented and all the segments forming a rod electrode may be maintained at both the same DC and RF voltages.

According to an embodiment, which is not shown in FIG. 6A, the top and bottom rods may form a continuous C-shape or oval shape. The dashed line in FIG. 6C indicates how according to an embodiment the top and bottom rods may be continuous or interconnected so as to form a C-shape or oval shape electrode.

If the top and bottom rods are continuous or interconnected at both ends then the top and bottom rods form an oval shape or elongated ring arrangement. If the top and bottom rods are continuous or interconnected at just one end then the top and bottom rods form a C-shape, or half oval shape or half ring arrangement. According to these embodiments ions are preferably confined in the z-direction by a pseudo-potential well.

Figure 7:
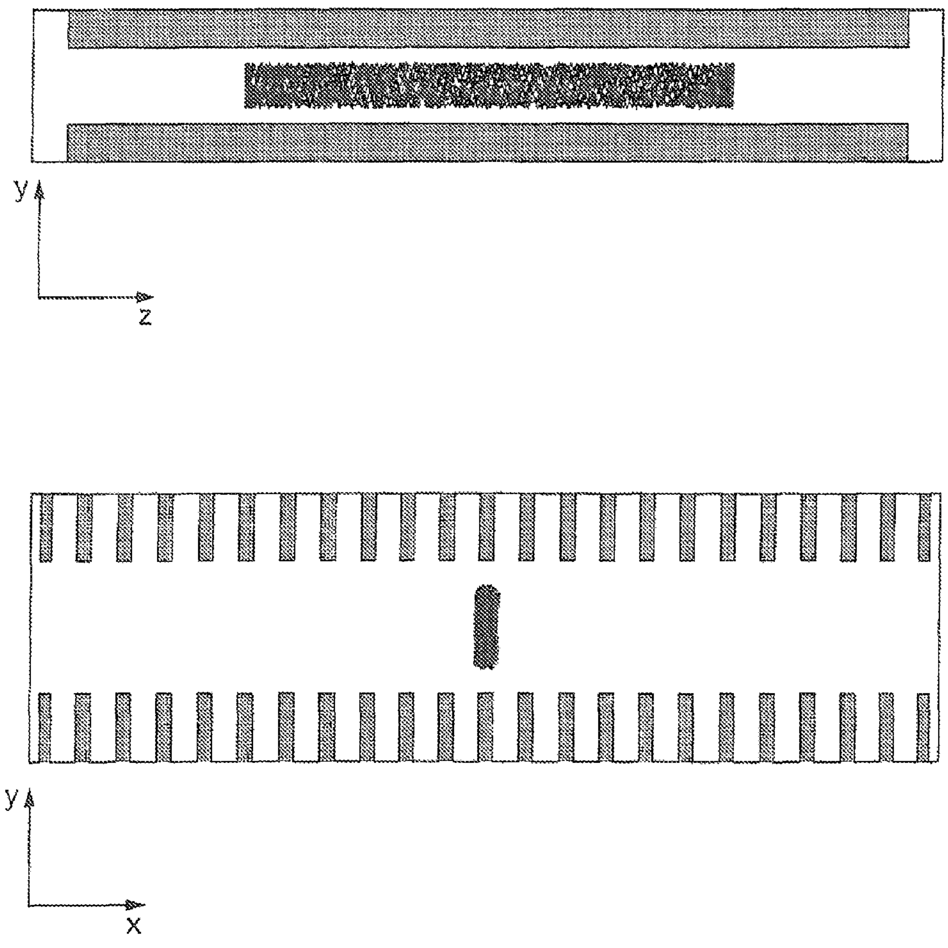
FIG. 7 shows ion trajectories produced in SIMION® highlighting the spatial confinement of an ion packet in a planar trap system consistent with a preferred embodiment of the present invention.

FIG. 7 shows a SIMION® simulation of the spatial confinement of an ion packet in a planar ion trap according to an embodiment of the present invention. FIG. 7 shows the trajectories of singly charged ions having a mass to charge ratio 500 over a time period of 20 ms. The RF phase alternates between rows of electrodes along the z-axis with 300 V RF (O-peak) applied at 2.5 MHz. A DC quadratic potential is also applied in the axial z-direction with a quadratic well depth of 15 V and a half length of 9.5 mm. The electrodes were modelled as being 0.5 mm wide with 1 mm gaps between adjacent electrodes in the z-axis. The gap between the planar arrays was modelled as being 5 mm in the y-axis and a DC barrier was applied at +1-22.5 mm along the x-axis in order to confine ions.

The ions are observed as being confined in a relatively large ion confinement volume which is elongated in two spatial directions.

An ion trap according to the preferred embodiment may be used in several different modes of operation.

Figure 8A:
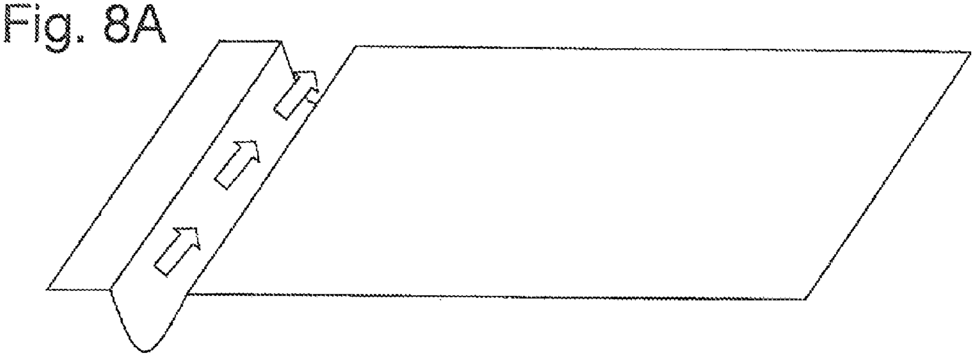
FIG. 8A shows an embodiment wherein the preferred ion trap may be operated as an ion guide.

In a mode of operation, the ion trap may be used as an ion transmission device and/or as a collision cell. This may be achieved by applying appropriate DC potentials to the electrodes so that one or more transmission channels exist through which ions my pass. FIG. 8A shows an embodiment wherein a portion of the ion trap is operated as an ion guide and/or as a collision cell.

Figure 8B:
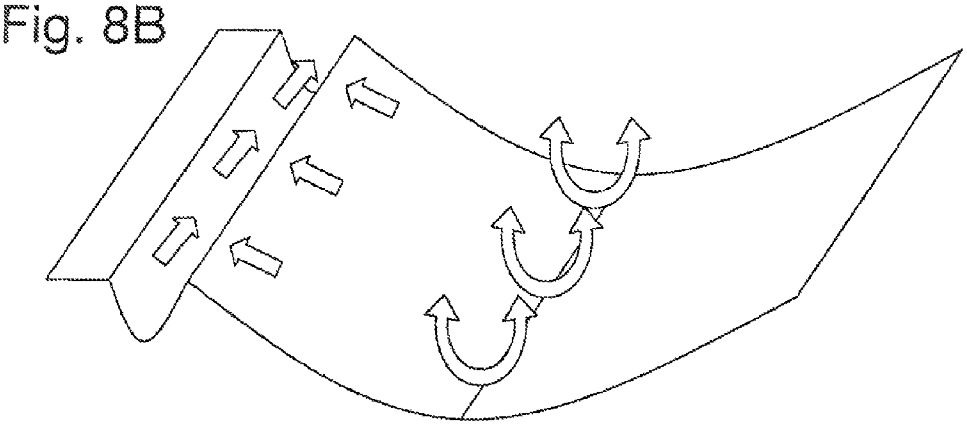
FIG. 8B shows an embodiment wherein ions are ejected from an ion trapping region into an ion channel and FIG. 8C shows a less preferred embodiment wherein ions are ejected in the x-direction.

In another mode of operation DC potentials may be applied as discussed above with reference to the preferred embodiment. In an embodiment as shown in FIG. 8B, ions may be ejected from a region of the ion trap towards the left hand side of the ion trap (i.e. in the z-direction) into a separate ion channel formed within a region of the ion trap. Ions may then be transferred out of the ion trap in the x-direction by transmitting the ions along the length of the ion channel. Ions ejected from the ion trap may be detected directly by an ion detector. Alternatively, the ions may be passed to further RF devices and/or one or more mass analysers for further processing and/or detection.

Figure 8C:
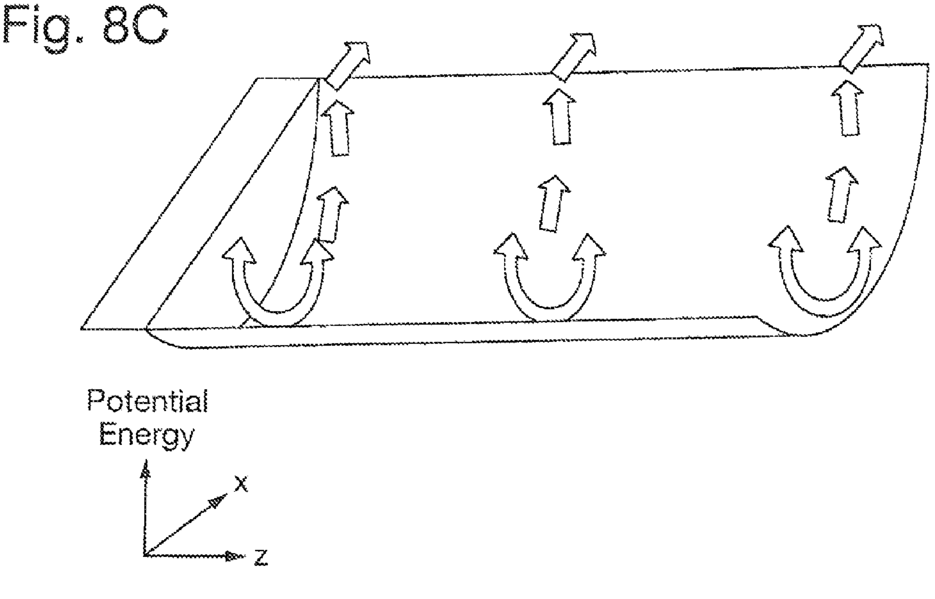

FIG. 8C shows a less preferred embodiment and corresponds with the embodiment shown and described above with reference to FIGS. 6A-6C. According to this embodiment a quadratic potential is maintained in the x-direction and ions are ejected from the ion trap in the x-direction.

According to an embodiment a device may be situated downstream of the preferred ion trap and may be used to collect and/or capture and/or focus the spatially extended beam of ions which is preferably ejected from the ion trap.

Figure 9:
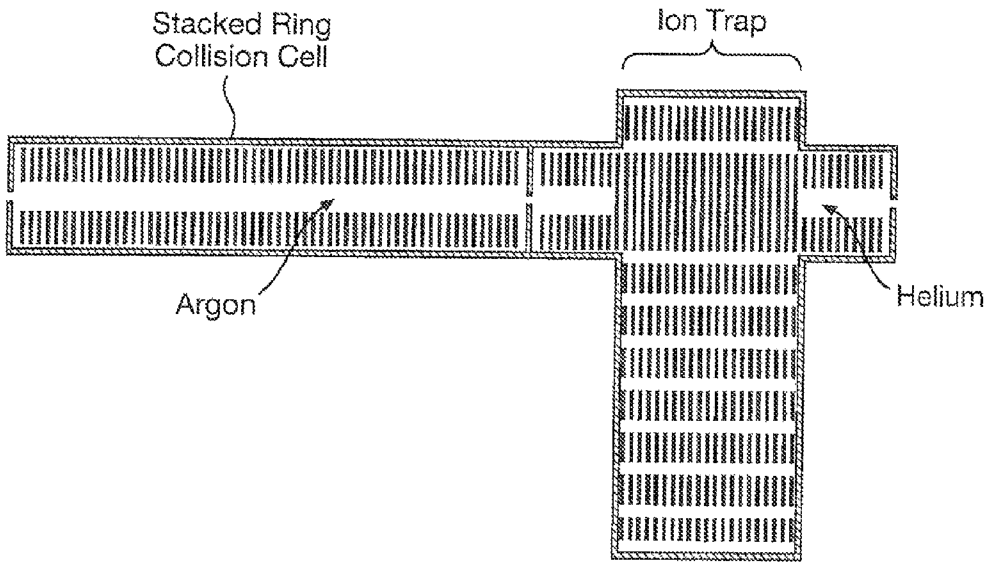
FIG. 9 shows an embodiment wherein the preferred ion trap is integrated with a Stacked Ring Ion Guide ("SRIG") collision cell.

FIG. 9 shows another embodiment of the present invention wherein a preferred ion trap is integrated with a Stacked Ring Ion Guide ("SRIG") collision cell. The stacked ring ion guide preferably contains argon gas for good fragmentation efficiency whereas the preferred ion trap preferably contains helium gas for good ejection efficiency. The collision cell and the preferred ion trap may be used in tandem as a single ion transmission and/or collision cell.

Alternatively, the collision cell and the preferred ion trap may be used separately i.e. the collision cell may be used to fragment and/or accumulate ions and the preferred ion trap may be used to hold and eject ions accumulated in the stacked ring ion guide.

FIGS. 10A-D show examples of instrument geometries according to various embodiments of the present invention. It will be apparent to those skilled in the art that there are many more potential configurations beyond these examples.

Figure 10A:
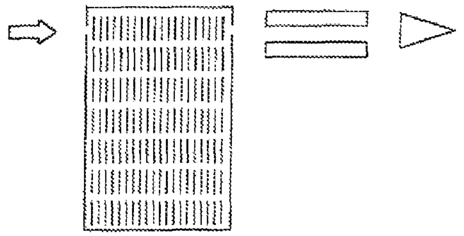
FIG. 10A shows an embodiment wherein a source of ions is followed by a preferred ion trap, a quadrupole and an ion detector.

FIG. 10A shows an embodiment wherein a source of ions is followed by a preferred ion trap, a quadrupole rod set and an ion detector.

Figure 10B:
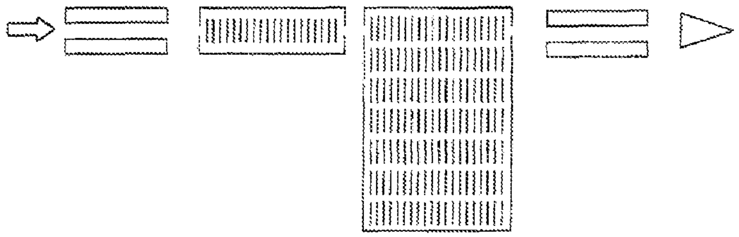
FIG. 10B shows an embodiment wherein a source of ions is followed by a quadrupole, a collision cell, a preferred ion trap, a further quadrupole and an ion detector.

FIG. 10B shows an embodiment wherein a source of ions is followed by a first quadrupole rod set, a collision cell, a preferred ion trap, a second quadrupole rod set and an ion detector.

Figure 10C:
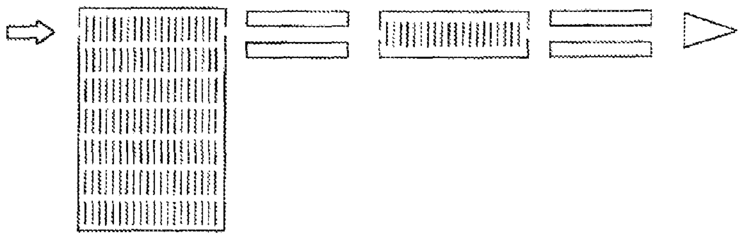
FIG. 10C shows an embodiment wherein a source of ions is followed by a preferred ion trap, a quadrupole, a collision cell, a further quadrupole and an ion detector

FIG. 10C shows an embodiment wherein a source of ions is followed by a preferred ion trap, a first quadrupole rod set, a collision cell, a second quadrupole rod set and an ion detector.

Figure 10D:
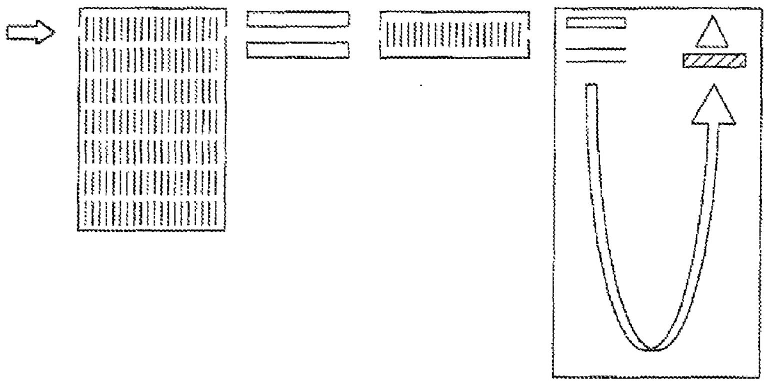
FIG. 10D shows an embodiment wherein a source of ions is followed by a preferred ion trap, a quadrupole, a collision cell and a Time of Flight mass analyser

FIG. 10D shows an embodiment wherein a source of ions is followed by a preferred ion trap, a quadrupole rod set, a collision cell and a Time of Flight mass analyser.

Figure 11A:
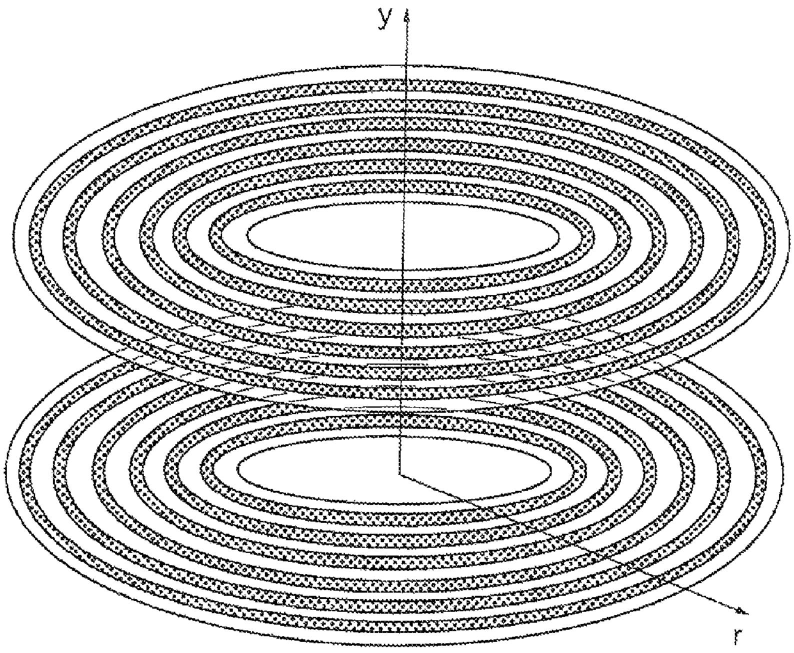
FIG. 11A shows an alternative embodiment wherein a plurality of concentric ring electrodes form an ion trap having a toroidal ion trapping region and FIG. 11B shows a side view showing the ring electrodes mounted on a PCB substrate and a quadratic DC potential which is maintained radially across the ring electrodes.

FIG. 11A shows a yet further embodiment wherein an ion trap is provided comprising two layers of electrodes. The first or upper layer of electrodes comprises a plurality of concentric first ring electrodes. The first ring electrodes have increasing radial diameters. The second or lower layer of electrodes comprises a plurality of concentric second ring electrodes. The second ring electrodes have increasing radial diameters.

Figure 11B:
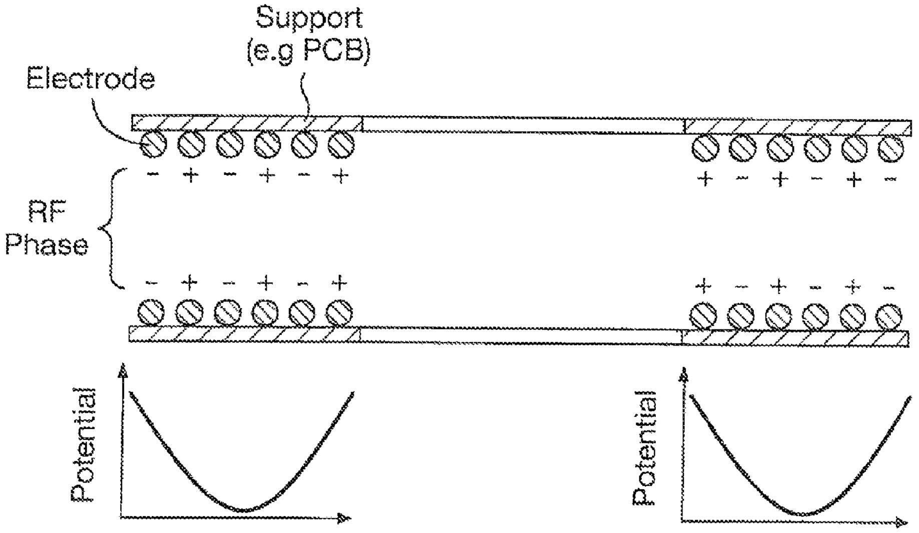

As shown in FIG. 11B, the first or upper layer of electrodes may be mounted on a substrate or other support member. The substrate or support member may, for example, comprise a printed circuit board. The second or lower layer of electrodes may also be mounted on a substrate or other support member (which may also comprise a printed circuit board). According to an embodiment adjacent ring electrodes in each layer are preferably maintained at opposite phases of an RF voltage. The first or upper layer of electrodes and the second or lower layer of electrodes are preferably aligned so that electrodes in both layers at the same radial displacement are preferably maintained at the same phase of an RF voltage.

A substantially DC quadratic potential is preferably maintained in a radial direction across the electrodes in the first or upper layer of electrodes and/or across the electrodes in the second or lower layer of electrodes as shown in FIG. 11B.

According to the embodiment shown and described above with reference to FIGS. 11A and 11B, a toroidal ion trapping volume is preferably created. Ions are preferably trapped in a radial direction by a DC potential barrier or well and ions are preferably trapped in an axial (y) direction by a RF or pseudo-potential barrier or well.

According to this embodiment the ion trap comprises a first group of electrodes and a second group of electrodes. The first group of electrodes comprises a first plurality of concentric closed loop, circular or oval electrodes arranged at different radial displacements. The second group of electrodes comprises a second plurality of concentric closed loop, circular or oval electrodes arranged at different radial displacements. The first and second groups of electrodes are arranged at different displacements in the first (y) direction.

Figure 12A:
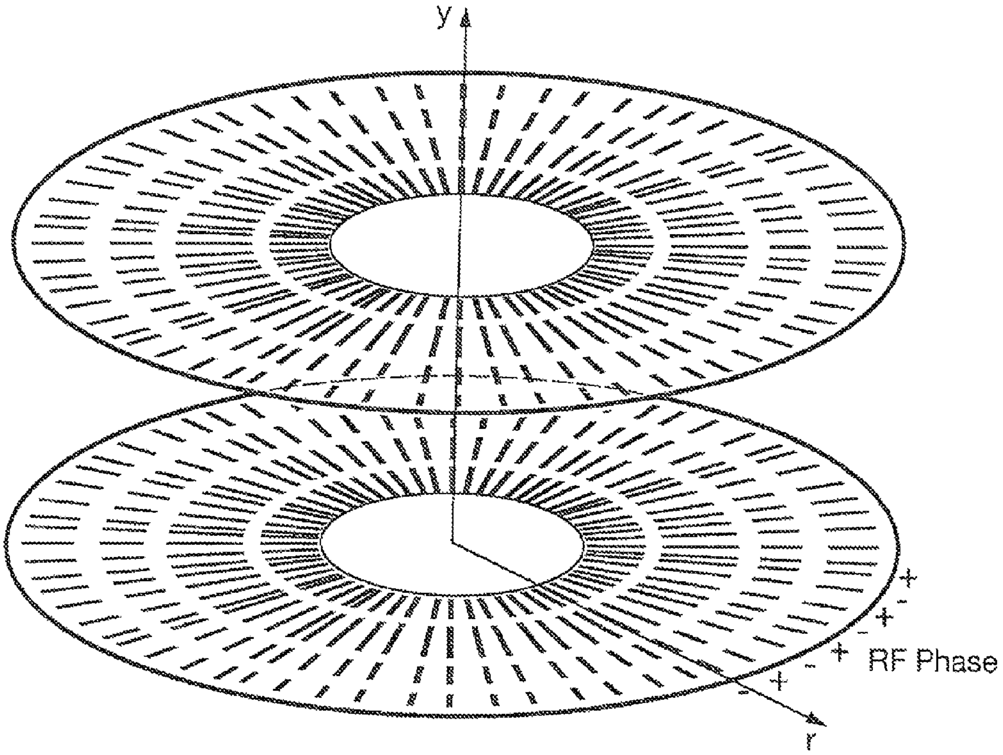
FIG. 12A shows a further alternative embodiment wherein annular arrays of electrodes form an ion trap having a toroidal ion trapping region and FIG. 12B shows a side view showing the annular arrays of electrodes mounted on a PCB substrate and a quadratic DC potential which is maintained radially across the array of electrodes.
Figure 12B:
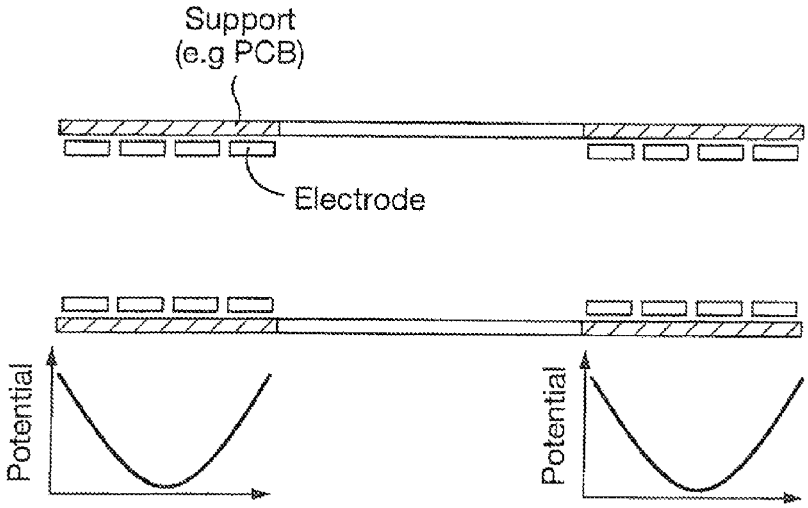

FIGS. 12A and 12B show a further embodiment similar to the embodiment described above with reference to FIGS. 11A and 11B. According to this embodiment a toroidal ion trapping volume is also created.

According to this embodiment the ion trap comprises a first group of electrodes and a second group of electrodes. The first group of electrodes comprises a first plurality of annular groups of electrodes wherein each of the first annular groups of electrodes is arranged at different radial displacements. The second group of electrodes comprises a second plurality of annular groups of electrodes wherein each of the second annular groups of electrodes is arranged at different radial displacements. The first and second groups of electrodes are arranged at different displacements in the first (y) direction.

According to the embodiments shown and described above with reference to FIGS. 11A-11B and 12A-12B the electrodes may be mounted on a substrate or support which may, for example, comprise a printed circuit board ("PCB").

A particularly advantageous feature of both embodiments is that the quadratic potential maintained in the radial (r) direction may be asymmetric such that when ions are excited and ejected from the ion trap in the radial (r) direction the ions are ejected towards the centre of the ion trap. As a result, ions may be ejected from a localised region of the ion trap and the geometry of the ion trap preferably enables ions to be either detected or onwardly transmitted using non-complex ion optics.

A further particular advantage of the ion trap as shown and described with reference to FIGS. 11A-11B and 12A-12B is that the ion trap may be arranged to have a much greater ion trapping volume than conventional 2D or 3D ion traps.

Ions may be resonantly or parametrically ejected from the ion trap by applying a supplemental AC voltage to the first or upper layer of electrodes and/or to the second or lower layer of electrodes in order to cause ions to be ejected radially from the ion trap.

It will be apparent that various modifications may be made to the particular embodiments discussed above without departing from the scope of the invention.

For example, embodiments are contemplated wherein the electrodes comprising the ion trap may comprise electrodes which are not rod shaped. For example, the electrodes may comprise a plurality of stacked plate electrodes, a plurality of stacked ring or oval electrodes, a plurality of half ring or half oval electrodes or a plurality of C-shaped electrodes. Embodiments comprising ring or oval electrodes, half ring or half oval electrodes or C-shaped electrodes have been described above with reference to FIG. 6C.

According to a less preferred embodiment the applied DC potential may be non-quadratic.

According to an embodiment, the DC potential well may be deeper on one side of the ion trap than on the other side of the ion trap. As a result, ions are preferably ejected in one direction rather than being ejected in two directions.

According to an embodiment, the direction of exit of ions from the ion trap may be changed by changing the depth of the DC well appropriately such that all or a selection of ions preferably exit one way or all or a selection of ions preferably exit the other way.

According to an embodiment, the ion trap may be operated in a linked scanning mode of operation with the mass to charge ratio ejection of ions from the DC well linked with the mass to charge ratio scan of an adjacent mass analyser.

According to an embodiment, there may be more than one ejection region.

According to an embodiment, ions may be injected in one place and either ejected from the same location or from another spatially distinct region.

Although the present invention has been described with reference to preferred embodiments, it will be understood by those skilled in the art that various changes in form and detail may be made without departing from the scope of the invention as set forth in the accompanying claims.

The invention claimed is:

1. A mass or mass to charge ratio selective ion trap comprising:
- a first device arranged and adapted to generate a radially asymmetric pseudo-potential barrier or well which acts to confine ions in a first (y) and a second (x) direction within said ion trap;
- a second device arranged and adapted to generate a substantially DC quadratic potential well which acts to confine ions in a third (z) direction within said ion trap; and
- a third device arranged and adapted to excite ions in said third (z) direction so as to mass or mass to charge ratio selectively eject ions in said third (z) direction.

2. A mass or mass to charge ratio selective ion trap as claimed in claim 1, wherein said first (y) direction or said second (x) direction or said third (z) direction are substantially orthogonal.

3. A mass or mass to charge ratio selective ion trap as claimed in claim 1, wherein said ion trap comprises a plurality of electrodes.

4. A mass or mass to charge ratio selective ion trap as claimed in claim 3, wherein said plurality of electrodes comprise:
- (i) a multipole rod set or a segmented multipole rod set comprising a plurality of or at least 4, 5, 6, 7, 8, 9, 10, 10-20, 20-30, 30-40, 40-50, 50-60, 60-70, 70-80, 80-90, 90-100 or >100 rod sets or segmented rod sets; or
- (ii) an ion tunnel or ion funnel comprising a plurality of or at least 4, 5, 6, 7, 8, 9, 10, 10-20, 20-30, 30-40, 40-50, 50-60, 60-70, 70-80, 80-90, 90-100 or >100 annular, ring or oval electrodes having one or more apertures through which ions are transmitted in use; or
- (iii) a plurality of or at least 4, 5, 6, 7, 8, 9, 10, 10-20, 20-30, 30-40, 40-50, 50-60, 60-70, 70-80, 80-90, 90-100 or >100 half annular, half ring, half oval or C-shaped electrodes; or
- (iv) a stack or array of planar, plate or mesh electrodes arranged generally in a plane in which ions travel in use.

5. A mass or mass to charge ratio selective ion trap as claimed in claim 3, wherein said first device is arranged and adapted to apply an RF voltage to at least some of said electrodes.

6. A mass or mass to charge ratio selective ion trap as claimed in claim 3, wherein said ion trap is arranged and adapted so that there is a full or direct line of sight through said ion trap in said third (z) direction.

7. A mass or mass to charge ratio selective ion trap as claimed in claim 3, wherein said ion trap is arranged and adapted so that there is a full or direct line of sight through said ion trap in said second (x) direction.

8. A mass or mass to charge ratio selective ion trap as claimed in claim 3, wherein said second device is arranged and adapted to form said substantially quadratic DC potential well so that either: (i) a minimum of said substantially quadratic DC potential well is along a central axis of said ion trap; or (ii) a minimum of said substantially quadratic DC potential well is offset from a central axis of said ion trap.

9. A mass or mass to charge ratio selective ion trap as claimed in claim 1, wherein said second device is arranged and adapted to maintain said substantially DC quadratic potential well across some but not all electrodes arranged in said third (z) direction.

10. A mass or mass to charge ratio selective ion trap as claimed in claim 1, wherein said second device is arranged and adapted to maintain a substantially DC quadratic potential well across x % of a width of said ion trap in said third (z) direction, wherein x is selected from the group consisting of: (i)<10; (ii) 10-20; (iii) 20-30; (iv) 30-40; (v) 40-50; (vi) 50-60; (vii) 60-70; (viii) 70-80; (ix) 80-90; (x) 90-95; and (xi) 95-99.

11. A mass or mass to charge ratio selective ion trap as claimed in claim 1, wherein said second device is arranged and adapted to maintain a DC potential profile in said third (z) direction across said ion trap wherein said DC potential profile comprises a first region and one or more second regions, wherein the DC potential profile in said first region is substantially quadratic and wherein the DC potential profile in said one or more second regions is substantially linear, constant or non-quadratic.

12. A mass or mass to charge ratio selective ion trap as claimed in claim 1, wherein said second device is arranged and adapted to maintain a DC potential profile in said third (z) direction which is asymmetric preferably about a central axis of said ion trap, wherein said central axis is preferably in said second (x) direction.

13. A mass or mass to charge ratio selective ion trap as claimed in claim 1, wherein said second device is arranged and adapted to maintain a DC potential profile in said third (z) direction which results in ions being ejected from said substantially DC quadratic well in one direction only.

14. A mass or mass to charge ratio selective ion trap as claimed in claim 1, wherein said third device is arranged and adapted so that ions are mass or mass selectively ejected from said ion trap either: (i) in a first direction only; or (ii) both in a first direction and a second direction, wherein said second direction is different to or opposed to said first direction.

15. A mass or mass to charge ratio selective ion trap as claimed in claim 1, wherein said third device is arranged and adapted to excite ions resonantly in said third (z) direction.

16. A mass or mass to charge ratio selective ion trap as claimed in claim 15, wherein said third device is arranged and adapted to apply a supplemental AC voltage or potential to at least some of said electrodes having a frequency σ which is equal to ω, wherein ω is a fundamental or resonance frequency of ions which are desired to be ejected from said ion trap.

17. A mass or mass to charge ratio selective ion trap as claimed in claim 16, wherein said third device is arranged and adapted to scan, vary, alter, increase, progressively increase, decrease or progressively decrease the frequency a of said supplemental AC voltage or potential.

18. A mass or mass to charge ratio selective ion trap as claimed in claim 15, wherein said third device is arranged and adapted to excite ions parametrically in said third (z) direction.

19. A mass or mass to charge ratio selective ion trap as claimed in claim 18, wherein said third device is arranged and adapted to apply a supplemental AC voltage or potential to at least some of said electrodes having a frequency σ equal to 2ω, 0.667ω, 0.5ω, 0.4ω, 0.33ω, 0.286ω, 0.25ω or <0.25ω, wherein ω is the fundamental or resonance frequency of ions which are desired to be ejected from said ion trap.

20. A mass or mass to charge ratio selective ion trap as claimed in claim 1, wherein said third device is arranged and adapted: (i) in a mode of operation to eject ions from said ion trap in order of their mass to charge ratio; or (ii) in a mode of operation to eject ions from said ion trap in reverse order of their mass to charge ratio.

21. A mass or mass to charge ratio selective ion trap as claimed in claim 1, wherein said third device is arranged and adapted to cause ions to be ejected from said ion trap in a substantially adiabatic manner.

22. A mass or mass to charge ratio selective ion trap as claimed in claim 1, wherein said third device is arranged and adapted to cause ions to be ejected from said ion trap with an ion energy selected from the group consisting of: (i)<0.5 eV; (ii) 0.5-1.0 eV; (iii) 1.0-1.5 eV; (iv) 1.5-2.0 eV; (v) 2.0-2.5 eV; (vi) 2.5-3.0 eV; (vii) 3.0-3.5 eV; (viii) 3.5-4.0 eV; (ix) 4.0 eV-4.5 eV; (x) 4.5-5.0 eV; and (xi) >5.0 eV.

23. A mass or mass to charge ratio selective ion trap as claimed in claim 1, wherein said ion trap is arranged and adapted to contain N ion charges within said ion trap, wherein N is selected from the group consisting of: (i)<$5\times10^4$; (ii) $5\times10^4$-$1\times10^5$; (iii) $1\times10^5$-$2\times10^5$; (iv) $2\times10^5$-$3\times10^5$; (v) $3\times10^5$-$4\times10^5$; (vi) $4\times10^5$-$5\times10^5$; (vii) $5\times10^5$-$6\times10^5$; (viii) $6\times10^5$-$7\times10^5$; (ix) $7\times10^5$-$8\times10^5$; (x) $8\times10^5$-$9\times10^5$; (xi) $9\times10^5$-$1\times10^6$; and (xii) >$1\times10^6$.

24. A mass or mass to charge ratio selective ion trap as claimed in claim 1, wherein in a mode of operation at least a region or substantially the whole of said ion trap is arranged and adapted to be operated:

(i) as an ion guide; or (ii) as a collision or fragmentation cell; or (iii) as a reaction cell; or (ii) as a mass filter; or (iii) as a time of flight separator; or (iv) as an ion mobility separator; or (v) as a differential ion mobility separator.

25. A mass or mass to charge ratio selective ion trap as claimed in claim 1, wherein in a mode of operation said ion trap is arranged and adapted to be maintained at a pressure selected from the group consisting of: (i)<$1.0\times10^{-7}$ mbar; (ii) $1.0\times10^{-7}$-$1.0\times10^{-6}$ mbar; (iii) $1.0\times10^{-6}$-$1.0\times10^{-5}$ mbar; (iv) $1.0\times10^{-5}$-$1.0\times10^{-4}$ mbar; (v) $1.0\times10^{-4}$-$1.0\times10^{-3}$ mbar; (vi) 0.001-0.01 mbar; (vii) 0.01-0.1 mbar; (viii) 0.1-1 mbar; (ix) 1-10 mbar; (x) 10-100 mbar; and (xi) 100-1000 mbar.

26. A mass spectrometer comprising a mass or mass to charge ratio selective ion trap as claimed in claim 1.

27. A mass or mass to charge ratio selective ion trap comprising:

a first device arranged and adapted to generate a pseudo-potential barrier or well which acts to confine ions in a first (y) direction and a DC potential barrier or well which acts to confine ions in a second (x) direction within said ion trap;

a second device arranged and adapted to generate a substantially DC quadratic potential well which acts to confine ions in a third (z) direction within said ion trap; and a third device arranged and adapted to excite ions in said third (z) direction so as to mass or mass to charge ratio selectively eject ions in said third (z) direction.

28. A mass or mass to charge ratio selective ion trap having a substantially toroidal ion trapping region, said ion trap comprising:

a first device arranged and adapted to generate a pseudo-potential barrier or well which acts to confine ions in a first (y) direction within said ion trap;

a second device arranged and adapted to generate a substantially DC quadratic well which acts to confine ions radially within said ion trap; and a third device arranged and adapted to excite ions in a radial (r) direction so as to mass or mass to charge ratio selectively eject ions in said radial (r) direction.

29. A mass or mass to charge ratio selective ion trap as claimed in claim 28, wherein said first (y) direction is substantially orthogonal to said radial (r) direction.

30. A mass or mass to charge ratio selective ion trap as claimed in claim 28, wherein said ion trap comprises a plurality of electrodes.

31. A mass or mass to charge ratio selective ion trap as claimed in claim 30, wherein said plurality of electrodes comprise:

(i) a first group of electrodes and a second group of electrodes, wherein said first group of electrodes comprises a first plurality of concentric closed loop, circular or oval electrodes arranged at different radial displacements and wherein said second group of electrodes comprises a second plurality of concentric closed loop, circular or oval electrodes arranged at different radial displacements, wherein said first and second groups of electrodes are arranged at different displacements in said first (y) direction; or (ii) a first group of electrodes and a second group of electrodes, wherein said first group of electrodes comprises a first plurality of annular groups of electrodes wherein each of said first annular groups of electrodes is arranged at different radial displacements and wherein said second group of electrodes comprises a second plurality of annular groups of electrodes wherein each of said second annular groups of electrodes is arranged at different radial displacements, wherein said first and second groups of electrodes are arranged at different displacements in said first (y) direction.

32. A mass or mass to charge ratio selective ion trap as claimed in claim 30, wherein said first device is arranged and adapted to apply an RF voltage to at least some of said electrodes.

33. A mass or mass to charge ratio selective ion trap as claimed in claim 28, wherein said ion trap is arranged and adapted so that there is a full or direct line of sight through said ion trap in said radial (r) direction.

34. A mass or mass to charge ratio selective ion trap as claimed in claim 28, wherein said third device is arranged and adapted to excite ions in a radial (r) direction so as to mass or mass to charge ratio selectively eject ions towards the centre of said ion trap.

35. A mass or mass to charge ratio selective ion trap as claimed in claim 28, wherein said pseudo-potential barrier or well comprises a non-quadrupolar pseudo-potential barrier or well.

36. A method of mass or mass to charge ratio selective ejection of ions from an ion trap comprising:

generating a radially asymmetric pseudo-potential barrier or well which acts to confine ions in a first (y) and a second (x) direction within said ion trap;

generating a substantially DC quadratic potential well which acts to confine ions in a third (z) direction within said ion trap; and exciting ions in said third (z) direction so as to mass or mass to charge ratio selectively eject ions in said third (z) direction.

37. A method of mass spectrometry comprising a method as claimed in claim 36.

38. A method of mass or mass to charge ratio selective ejection of ions from an ion trap comprising:

generating a pseudo-potential barrier or well which acts to confine ions in a first (y) direction and a DC potential barrier or well which acts to confine ions in a second (x) direction within said ion trap;

generating a substantially DC quadratic potential well which acts to confine ions in a third (z) direction within said ion trap; and exciting ions in said third (z) direction so as to mass or mass to charge ratio selectively eject ions from said ion trap in said third (z) direction.

39. A method of mass or mass to charge ratio selective ejection of ions from an ion trap having a substantially toroidal ion trapping region, comprising:

generating a pseudo-potential barrier or well which acts to confine ions in a first (y) direction within said ion trap;

generating a substantially DC quadratic well which acts to confine ions radially (r) within said ion trap; and exciting ions in a radial (r) direction so that ions are mass or mass to charge ratio selectively ejected in said radial (r) direction.

* * * * *